United States Patent [19]

Sanders

[11] 4,114,716
[45] Sep. 19, 1978

[54] HOUSING APPARATUS
[75] Inventor: Julian V. Sanders, Decatur, Ill.
[73] Assignee: Caterpillar Tractor Co., Peoria, Ill.
[21] Appl. No.: 810,549
[22] Filed: Jun. 27, 1977
[51] Int. Cl.² ............................................. B60K 11/04
[52] U.S. Cl. .................................. 180/68 R; 180/29; 180/89.12
[58] Field of Search ............... 180/68 R, 89.12, 64 R, 180/29

[56] References Cited
U.S. PATENT DOCUMENTS
3,929,202  12/1975  Hobbensietken .................. 180/68 R Primary Examiner—Kenneth H. Betts
Assistant Examiner—Gene A. Church
Attorney, Agent, or Firm—John L. James

[57] ABSTRACT

Housing apparatus includes a frame which has an axis and an engine housing connected to the frame. First and second radiator housing portions are connected to the frame generally rearward of the engine housing with each radiator portion positioned on a respective opposed side of the engine housing. The engine housing and first and second radiator portions are of a construction sufficient for providing a field of vision to preselected locations along the axis and on opposed sides thereof.

7 Claims, 3 Drawing Figures

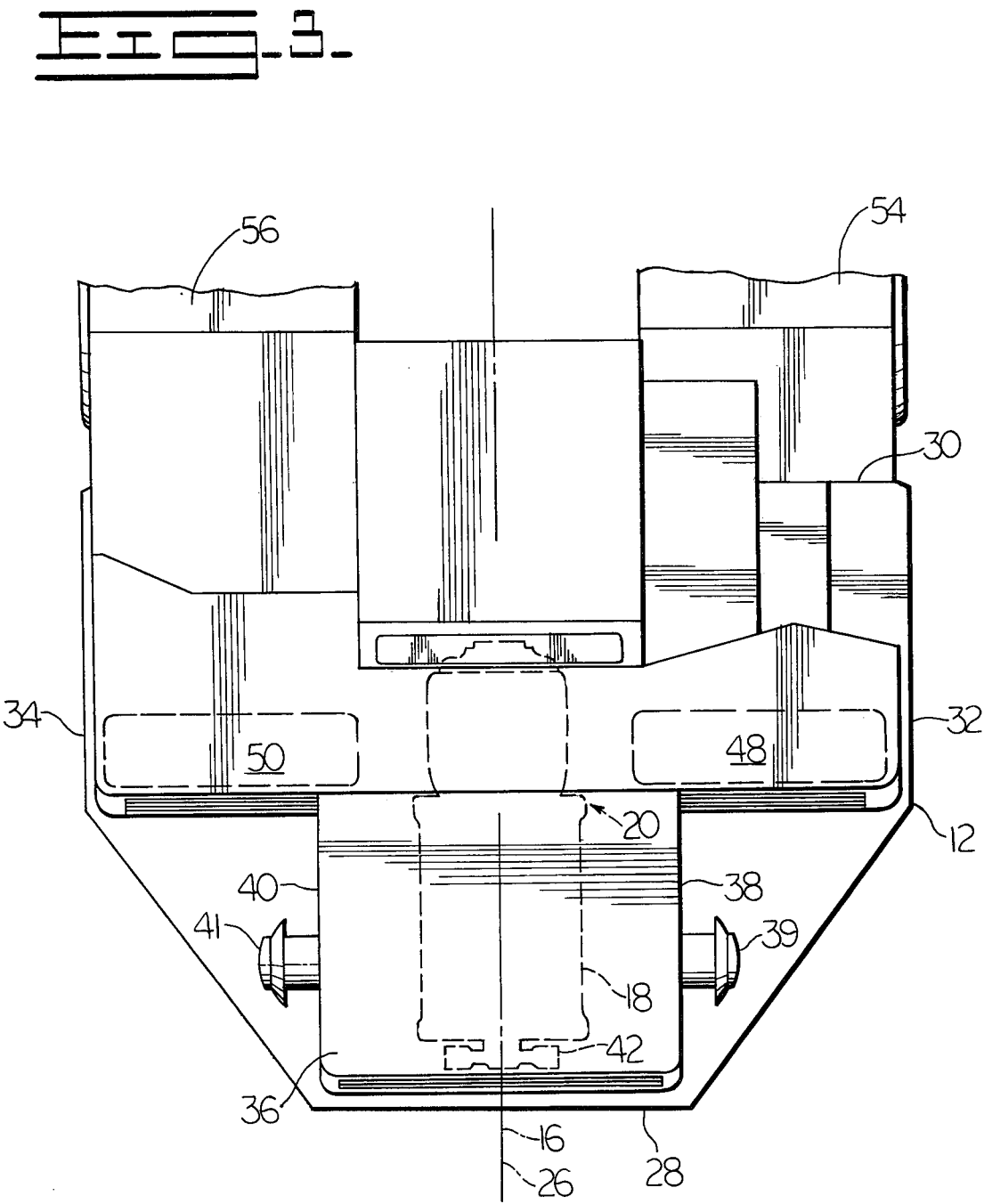

HOUSING APPARATUS

BACKGROUND OF THE INVENTION

Large, material moving vehicles, such as tractor-scrapers for example, have a tractor portion which moves a body or scraper portion. The tractor portion is often constructed so that an operator compartment is located to one side of the vehicle which provides an unobstructed field of vision to one side of the vehicle. Large tractors have large radiators which sometimes obstruct vision or limit the field of vision. It is desirable to have a tractor which provides a substantially unobstructed field of vision and has the radiator and other components cooperatively arranged.

SUMMARY OF THE INVENTION

The present invention is directed to overcoming one or more of the problems as set forth above.

According to the present invention, an engine housing is connected to a frame and generally centered along an axis of the frame. First and second radiator portions are connected to the frame generally rearward of the engine housing with each radiator portion positioned on a respective opposed side of the engine housing and positioned at a generally higher elevation than the engine housing. The engine housing and first and second radiator housing portions are of a construction sufficient for providing a field of vision substantially free of obstructions to preselected locations along the axis on an opposed side thereof.

BRIEF DESCRIPTION OF THE DRAWINGS

FIG. 3 is a plan view of the tractor.

DETAILED DESCRIPTION

Figure 1:
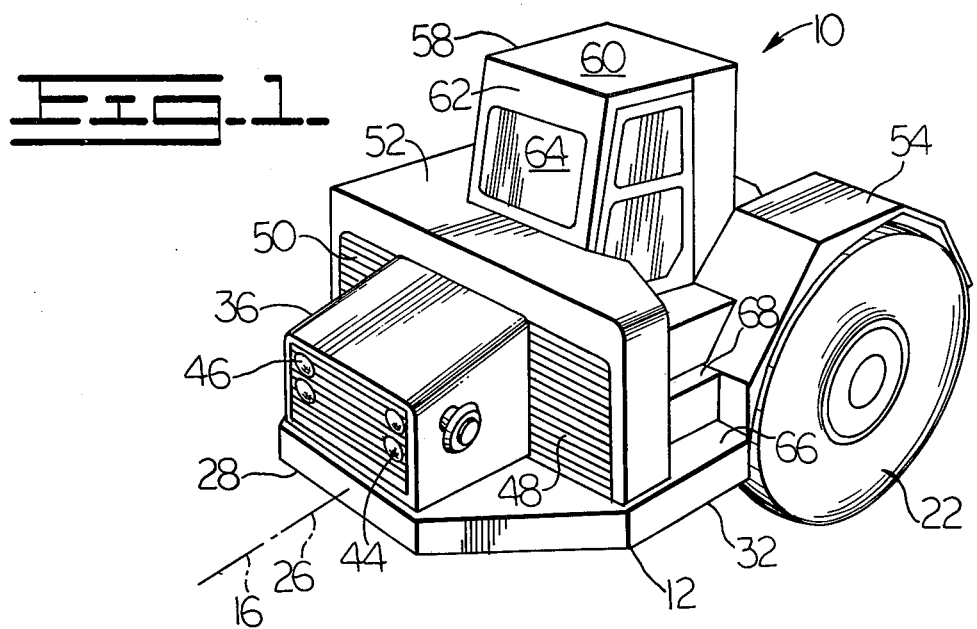
FIG. 1 is an isometric view of a vehicle tractor.
Figure 2:
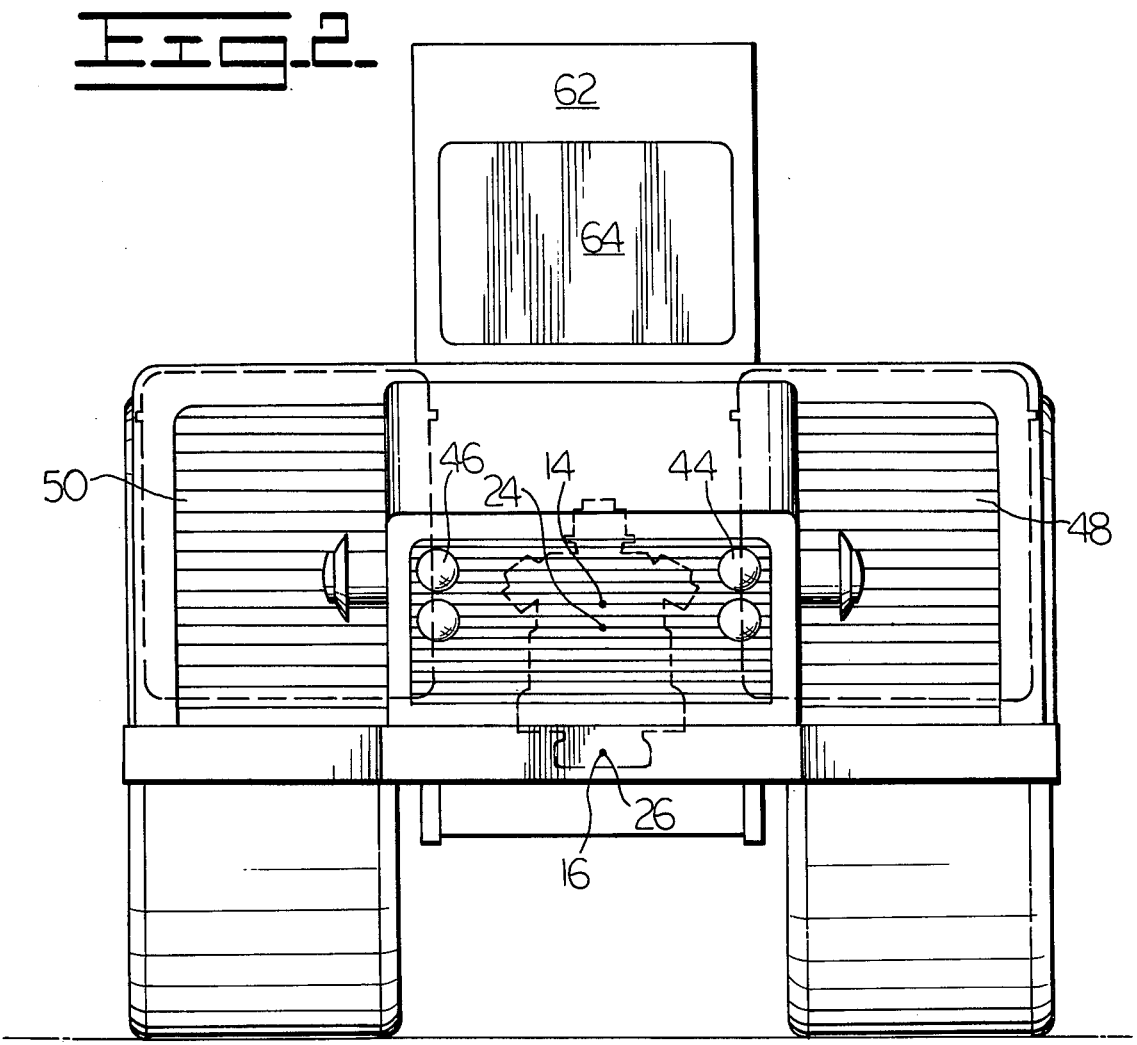
FIG. 2 is a front view of the tractor.

Referring to FIGS. 1-3, a vehicle tractor 10, such as a tractor portion of a tractor-scraper, for example, has a frame 12, a center of gravity 14, and a generally longitudinal axis 16. An engine 18 is connected to the frame 12 and to a power train 20 which propels a set of drive wheels 22 in a forward and a rearward direction. The engine 18 is generally centered along the axis 16 and has a center of gravity 24 which is preferably located at a lower elevation than the center of gravity 14 of the tractor 10.

The frame 12 has an axis 26 and is preferably of a polygonal configuration wherein first and second generally parallel sides 28, 30 are each generally perpendicular to the axis 26 and third and fourth generally parallel sides 32, 34 are each generally parallel to the axis 26. The frame axis 26 and the vehicle axis 16 are preferably vertically parallel and coincident.

An engine housing 36 has first and second opposed side portions 38, 40 which each have a generally right trapezoidal configuration. The housing 36 is generally centered over the frame axis 26 forward of and enclosing the engine 18 adjacent the first side 28 of the frame 12. The side portions 38, 40 each contain an air inlet 39, 41, respectively and slope downward towards the first side 28 of the frame 12 and give the engine housing 36 a generally square, snub-nosed appearance. The housing 36 is preferably of a size sufficient for housing the engine 18, but can be of a size sufficient for housing other apparatus, such as a pump 42, for example.

First and second headlight housings 44, 46 are preferably connected to the front of the engine housing 36 on opposed sides of the frame axis 26.

First and second radiator housing portions 48, 50 are connected to the frame 12 rearward of and adjacent the engine housing 36. The first and second radiator portions 48, 50 preferably form a unitary radiator housing 52 which is centered over the frame axis 26 at a generally higher elevation than the engine housing 36. The first and second portion 48, 50 generally extend from the axis 26 towards the third and fourth sides 32, 34 of the frame 12 to locations beyond the first and second side portions 38, 40, respectively, of the engine housing 36. The engine housing 36 and unitary radiator housing 52 can jointly house the engine 18 so that the length of the engine housing 36 can be less than the length of the engine 18.

First and second wheel guards 54, 56 are connected to the second side 30 of the frame 12 on opposed sides of the frame axis 26 and are spaced from the unitary radiator housing 52 on the side of the unitary radiator housing 52 opposite the engine housing 36. The wheel guards 54, 56 each preferably have a semi-octagonal configuration for partially, circumferentially enclosing one of the drive wheels 22.

An operator compartment 58 is preferably positioned generally rearward of the engine 18 and generally centered over the axis 16 at a generally higher elevation than the engine and unitary radiator, housings 36, 52, and the wheel guards 54, 56. The compartment 58 is generally positioned between the wheel guards 54, 56 and the unitary radiator housing 52.

The operator compartment 58 preferably has generally rectangular top and side portions 60, 62, and at least one window 64 formed in the side portion 62. The window 64 is preferably generally rectangular and fitted with a glass weather shield. The window 64 is of a construction sufficient for providing a substantially unobstructed field of vision from preselected areas inside the compartment 58 to preselected locations along the axis 16 of the tractor 10 and to preselected locations on either side of the axis 16. The preselected areas inside the compartment are the areas occupied by an operator. The field of vision is substantially unobstructed by the side portion 62 of the operator compartment and other components which are mounted on the frame 12.

A first step 66 is formed by the frame 12, the wheel guard 54, and the first radiator portion 48. Other steps 68 are connected to the first step 66 and the operator compartment 58.

In operation, the operator looks through the window 64 over the radiator and engine housings 48, 50, 36 and the wheel guards 54, 56 to locations alongside the vehicle 10 and in front of the vehicle 10. The operator looks over the sloping engine housing 36 to locations close to the front of the vehicle 10 and can see well on either side of the vehicle 10. The operator compartment 58 is centered over the axis 16 of the vehicle 10 where tilting is minimum when operating on an inclined pathway. The center of gravity 24 of the engine 18 helps stabilize the vehicle 10 when it operates on an inclined or uneven pathway.

The wheel guards, radiator housing, and engine housing are cooperatively arranged to provide the operator a substantially unobstructed field of vision to the front and sides of the vehicle.

Other aspects, objects, and advantages will become apparent from a study of the specification, drawings, and appended claims.

The embodiments of the invention in which an exclusive property or privilege is claimed are defined as follows:

1. An apparatus comprising:
    a frame having an axis, first and second generally parallel sides which are generally perpendicular to said axis and third and fourth generally parallel sides which are generally parallel to said axis and connected to said second side;
    an engine housing having side portions and being connected to said frame and generally centered over said axis and positioned along said first side;
    a unitary radiator housing connected to said frame adjacent said engine housing and being generally centered over said axis and extending between the third and fourth sides to locations beyond said engine housing side portions;
    a pair of wheel guards connected to said frame on opposed sides of said axis and spaced from said radiator housing, said radiator housing being positioned between said wheel guards and said engine housing and connected to said second side; and
    an operator compartment having top and side portions and being generally positioned between said wheel guards and said radiator housing and generally centered over said axis.

2. An apparatus, as set forth in claim 1, wherein said operator compartment is positioned at a higher elevation than said wheel guards, unitary radiator housing and engine housing and wherein a preselected area inside said compartment is visible from a preselected location along said axis and preselected locations on opposed sides of said axis.

3. An apparatus, as set forth in claim 1, wherein a selected one of said wheel guards is connected to the second side adjacent the third side and forms a first step defined by said selected wheel guard, said third side and said radiator.

4. An apparatus, as set forth in claim 3, including a second step connected to said first step.

5. An apparatus, as set forth in claim 1, wherein each of said wheel guards is of a generally semioctagonal configuration.

6. An apparatus, as set forth in claim 1, wherein each of said engine housing side portions are of a trapezoidal configuration.

7. An apparatus, as set forth in claim 1, including first and second air inlets positioned on the engine housing side portions.

* * * * *